United States Patent Office 2,840,544
Patented June 24, 1958

2,840,544

CONDENSATION POLYMERS OF 2,6-DIHYDROXY-4-CARBOXY-PYRIDINE AND FORMALDEHYDE AND METHOD OF MAKING THE SAME

Frank M. Precopio, Schenectady, N. Y., assignor to General Electric Company, a corporation of New York No Drawing. Application December 20, 1954
Serial No. 476,543

9 Claims. (Cl. 260—67.5)

The present invention relates to new polymers and particularly to polymers made from hydroxy pyridines by reaction with aldehydes and to the methods of making such polymers.

It is an important object of the present invention to provide new and improved polymers and particularly polymers formed from hydroxy pyridines by reaction with aldehydes.

Another object of the invention is to provide a new polymer of the type set forth which is useful as a good soil conditioner and which is useful as a sequestering agent.

Yet another object of the invention is to provide methods of forming polymers of the type set forth above.

It has been found that the above objects are obtained by reacting hydroxy pyridines with an aldehyde. The resultant products are useful as good soil conditioners and as polymeric sequestering agents.

In general the present invention contemplates the use of hydroxy pyridines and more particularly dihydroxy pyridines as one of the polymer forming reagents. A preferred class of dihydroxy pyridines are those which are further substituted on one of the unsubstituted carbons in the pyridine ring. A preferred substituted group is a carboxy group.

The invention will be described as applied to 2,6-dihydroxy-4-carboxy-pyridine. This compound has the following structural formula:

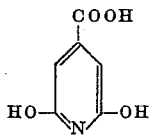

The above compound is also sometimes called 2,6-dihydroxy-isonicotinic acid or citrazinic acid or CZA.

In the present invention the polyhydroxy pyridine, such as the citrazinic acid described above is reacted with an aldehyde, such as formaldehyde to produce a polymer. A preferred aldehyde for use in the present invention is formaldehyde which is used as an aqueous solution known as Formalin. Formalin is an aqueous solution of formaldehyde containing 40 grams of formaldehyde in 100 cc. of the solution which is equivalent to 37% by weight of formaldehyde.

The following is an example of the method of reacting citrazinic acid with Formalin and the product made thereby. It is to be understood that this example is given only for purposes of illustration and is not to be construed as a limitation of the invention.

Example 1

Twenty grams (0.128 mole) of citrazinic acid were suspended in 50 ml. of water in a 3-necked flask equipped with a stirrer, addition funnel, and a reflux condenser. 21.6 grams (0.266 moles) of Formalin were slowly run into the suspension. The suspension developed a deep yellow color. The mixture was refluxed for 12 hours at a temperature of 100° C. The resultant product was collected on a filter, washed with water and dried.

The resultant product was an amorphous yellow polymer which could be pressed into brittle discs. It is believed that the polymer has the following repeating structural unit:

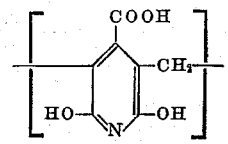

It was calculated that a polymer having the above structure would contain the following percentages of carbon, hydrogen and nitrogen: carbon, 50.0%; hydrogen, 3.0%; and nitrogen, 8.4%. By direct analysis it is found that the products contained the following percentage of these elements: carbon, 49.4%; hydrogen, 4.0%; and nitrogen, 6.5%.

The polymer was found to be insoluble in boiling water, benzene and tetrahydrofuran. It formed a dark green solution with dimethyl formamide.

The infrared spectrum of the polymer shows a broad adsorption in the region $4.0\mu$ indicating a high degree of hydrogen bonding in the molecule.

The polymer dissolved slowly in 10% potassium hydroxide solution in water to give a deep purple solution. Slow evaporation of the water deposited a brittle film of the potassium salt which is believed to have the following structural formula for the repeating unit:

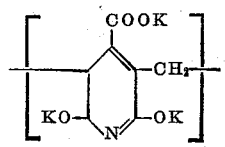

The potassium salt of the polymer can be pressed into brittle discs.

When a sample of the polymer was dissolved in a 10% aqueous solution of sodium bicarbonate, a deep reddish brown solution of the sodium salt of the polymer was obtained. It is believed that the sodium salt of the polymer has the following structural formula for the repeating unit:

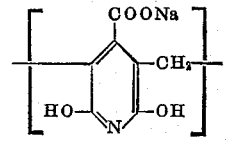

The sodium salt of the polymer can be pressed into brittle discs.

The polymer is useful as a soil conditioner and is also useful as a polymeric sequestering agent.

Although a specific example of the invention has been given for purposes of illustration, it is to be understood that various changes and modifications can be made therein without departing from the spirit and scope thereof. Accordingly, the resin of this invention and its sodium and potassium salts are to be limited only as set forth in the following claims.

What I claim as new and desire to secure by Letters Patent of the United States is:

1. A condensation polymer product of 2,6-dihydroxy-4-carboxy-pyridine and formaldehyde prepared by reacting one mole of the pyridine with essentially two moles of formaldehyde in aqueous solution.

2. The method of forming a polymer comprising condensing one mole of 2,6-dihydroxy-4-carboxy-pyridine with essentially two moles of aqueous formaldehyde, 3. The potassium salt of a condensation polymer product of claim 1.

4. The sodium salt of a condensation polymer product of claim 1.

5. The method of forming a polymer comprising condensing one mole of 2,6-dihydroxy-4-carboxy-pyridine with essentially two moles of an aqueous solution of formaldehyde at reflux temperature.

6. The method of forming a polymer comprising condensing one mole of 2,6-dihydroxy-4-carboxy-pyridine with essentially two moles of aqueous formaldehyde to form a first reaction product, thereafter adding to the first reaction product at least one mole of an aqueous solution of potassium hydroxide, and separating the resultant potassium salt of the polymer.

7. The method of forming a polymer comprising condensing one mole of 2,6-dihydroxy-4-carboxy-pyridine with essentially two moles of aqueous formaldehyde to form a first reaction product, thereafter adding to the first reaction product at least one mole of an aqueous solution of sodium bicarbonate, and separating the resultant sodium salt of the polymer.

8. The alkali metal salt, selected from the group consisting of potassium salts and sodium salts, of the condensation polymer product of claim 1.

9. The method of forming a polymer comprising condensing one mole of 2,6-dihydroxy-4-carboxy-pyridine with essentially two moles of aqueous formaldehyde to form a first reaction product, thereafter adding to the first reaction product at least one mole of an aqueous solution of an alkali metal base selected from the class consisting of potassium hydroxide and sodium bicarbonate, and separating the resultant alkali metal salt of the polymer.

References Cited in the file of this patent

UNITED STATES PATENTS 2,497,732     Hoffman _____ Feb. 14, 1950
2,742,478     Bavley et al. _____ Apr. 17, 1956

OTHER REFERENCES

Walker: "Formaldehyde," Reinhold Publishing Co., N. Y., Second Edition (1943), page 359.